DATA RECORDING SYSTEM

Filed Aug. 12, 1958 3 Sheets-Sheet 1

Inventors
ROBERT L. WHITTLE
JOSEPH LUONGO
RICHARD H. RYMER
By William E. Gleason
Attorney

DATA RECORDING SYSTEM

Filed Aug. 12, 1958 3 Sheets-Sheet 2

Inventors
ROBERT L. WHITTLE
JOSEPH LUONGO
RICHARD H. RYMER

By William E. Glasser
Attorney

Inventors
ROBERT L. WHITTLE
JOSEPH LUONGO
RICHARD H. RYMER
By William E. Sleaver
Attorney

United States Patent Office 3,104,147
Patented Sept. 17, 1963

3,104,147

DATA RECORDING SYSTEM

Robert L. Whittle and Joseph Luongo, Cedar Grove, N.J., and Richard H. Rymer, Atlanta, Ga., assignors to International Telephone and Telegraph Corporation, Nutley, N.J., a corporation of Maryland Filed Aug. 12, 1958, Ser. No. 754,650
7 Claims. (Cl. 346—33)

This invention relates to data processing systems and in particular to a system which records coded data on a film frame for use in conjunction with other subject matter applied to said frame.

In the art of photographing it is often important to be able to recall pertinent information about the picture at some later date. The most common example of this is the family album wherein there is written the names of people, places and dates on the back of family pictures for further use.

In some practices of photography other than the family album, it becomes even more important to have statistical information accompany the subject matter on the film in order to properly interpret the meaning of the subject matter or picture. Aerial reconnaissance is a foremost example of such photographic practice. When the aircraft has taken a series of pictures and has returned to the base these pictures must be interpreted.

Up to the present time when such aerial reconnaissance is made, the interpretation of such pictures is accomplished in one of two ways. The more popular way is to use the navigator's log. In other words, the persons examining the pictures would refer to the navigator's log to find the location of the airplane, the speed of the airplane, the drift and many other statistical information bits necessary for an understanding as to where the aircraft was when the pictures were taken. A second way that has been used to accomplish this has been to provide in the aircraft a plurality of repeater instruments, which are coupled to the main instruments of the aircraft. At such time as there is a photograph taken there is also a photograph taken of the repeater instruments which provides the statistical information mentioned above.

Each of these methods for obtaining the statistics has undesirable aspects when used for the final interpretation. For instance, the instruments of an airplane will provide the ground track or the true course and very often the drift angle, but these two bits of information must be used together in order to provide the axis of the airplane which is necessary in order that a reliable interpretation of the picture can be had. When the repeater instruments are used there is a limitation on the number of repeaters which can be used, simply because of the limited space in the aircraft.

Since much of the statistical data in its raw form must be corrected, for example, the axis of the airplane, as described above, or the latitude or longitude of the airplane when the aircraft is in a bank or a roll maneuver, it is desirable to have this raw information for ready use in a computer. It follows then that a system for providing statistical information related to the time of taking the picture, as in aerial reconnaissance practice, which information can be substantially unlimited in amount and in such form as to be readily used in a computer would be highly desirable.

It is therefore an object of the present invention to provide a better data accumulating and presentation arrangement for recording data.

A further object is to provide a system for continually compiling statistical data which can be electronically extracted for use with photographed subject matter at any time such subject matter is applied to the film or a picture is taken.

Another object is to provide a system for producing the raw data, accompanying and pertinent to a recording of certain information, in such form as to be readily used in a binary language computer.

A still further object is to provide a system which permits a relatively greater amount of statistical data to be gathered and recorded for use with a photographed picture.

In accordance with one feature of the present invention there is provided a counting chain which is sub-divided into four counter portions to provide a timing clock for the production of dots of a dotted raster; the horizontal rows of a dotted raster, vertical columns of rows of a dotted raster and the assurance of a full raster presentation after an arbitrary demand signal is received for such dotted raster information.

Another feature provides a plurality of analog-to-digital converters each of whose analog end represents a statistical bit of information related to an aircraft or ship's movement and whose digital output represents this statistical information in digital form.

Still another feature, involved in conjunction with the above features, provides switching diode matrices to apply information signals from the analog-to-digital converters to a cathode ray tube for a graphic display thereof in accordance with the timing of the counter chain.

The invention further provides a camera which takes pictures of the main object, such as terrain, while simultaneously taking pictures of a graphic dotted raster display on a cathode ray tube in order that such information may accompany the main picture.

The foregoing and other objects and features of this invention will be best understood by reference to the following description of an embodiment of the invention taken in conjunction with the accompanying drawings, wherein.

Figure 1:
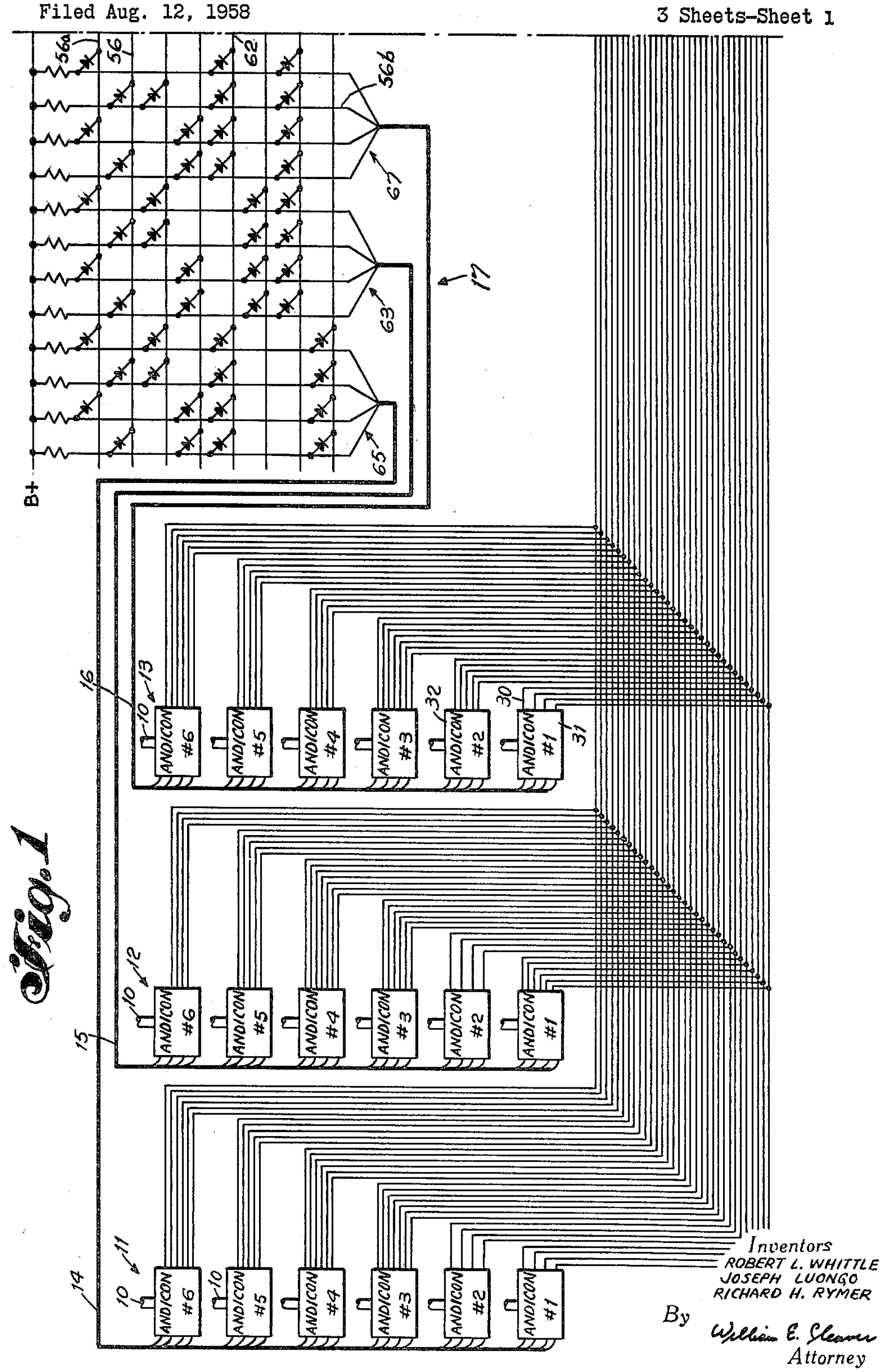
FIG. 1 is a schematic and block diagram showing three banks of analog-to-digital converters and one of the switching matrices which scans these converters.

Referring to FIG. 1, there is found a plurality of analog-to-digital converters hereinafter called Andicons. The three banks of Andicons are respectively and collectively indicated as 11, 12 and 13. The Andicons at their respective analog portions each represent some bit of statistical information related to an aircraft's flight, for instance, latitude, longitude, air temperature, speed, drift, attitude, etc. These Andicons might be any of the known analog-to-digital converters wherein the analog portion will provide the above statistical information; however, in the preferred embodiment these Andicons are of the type described in the copending application of Luongo et al., entitled "Analog-to-Digital Translator," Serial No. 621,399, filed November 9, 1956, now U.S. Patent No. 2,958,861 issued Nov. 1, 1960. The Andicons as described in the last-mentioned patent application are relatively compact such that a maximum of such instruments can be provided without burdening the critical space allocation in an aircraft. The shafts 10 of the Andicons' analog ends provide a direct coupling to the instruments detecting the statistical information, such as the meters registering temperature, pressure, etc. Coupled to the scanning input of each of the Andicons are respectively the scanning line cables 14, 15 and 16 each of which carries four scanning lines. These scanning lines are respectively coupled to the diode matrix 17. The outputs of the Andicons are respectively coupled to the diode matrix 18 of FIG. 3. The input lines to the diode matrix 17 are respectively coupled to the counter chain 19 of FIG. 2 and specifically to the divide-by-five counter 20 and the divide-by-three counter *20a*.

Figure 2:
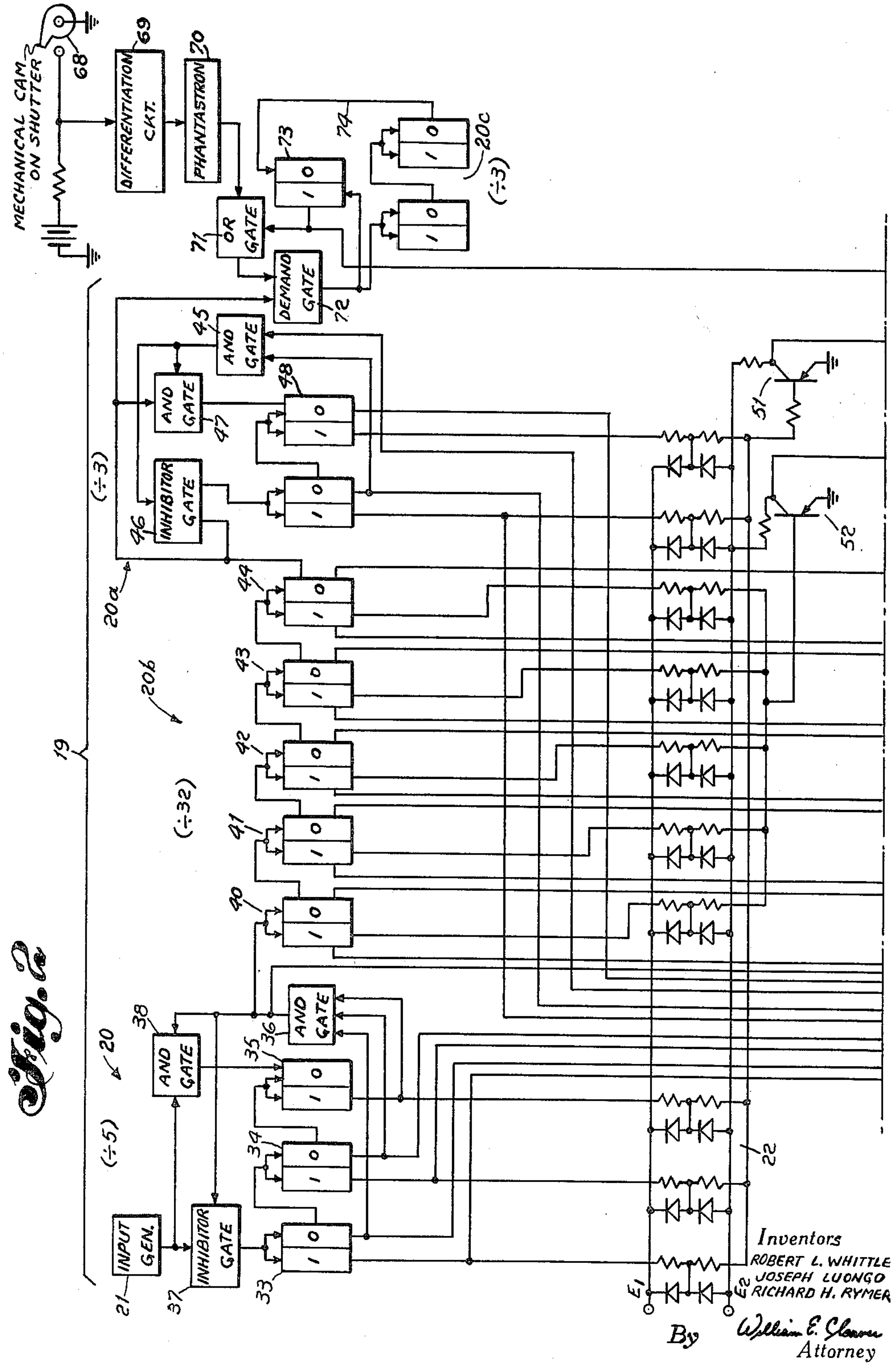
FIG. 2 is a schematic and block diagram showing the counter chain as sub-divided into its four portions and the control circuitry associated therewith.
Figures 3, 4, 5:
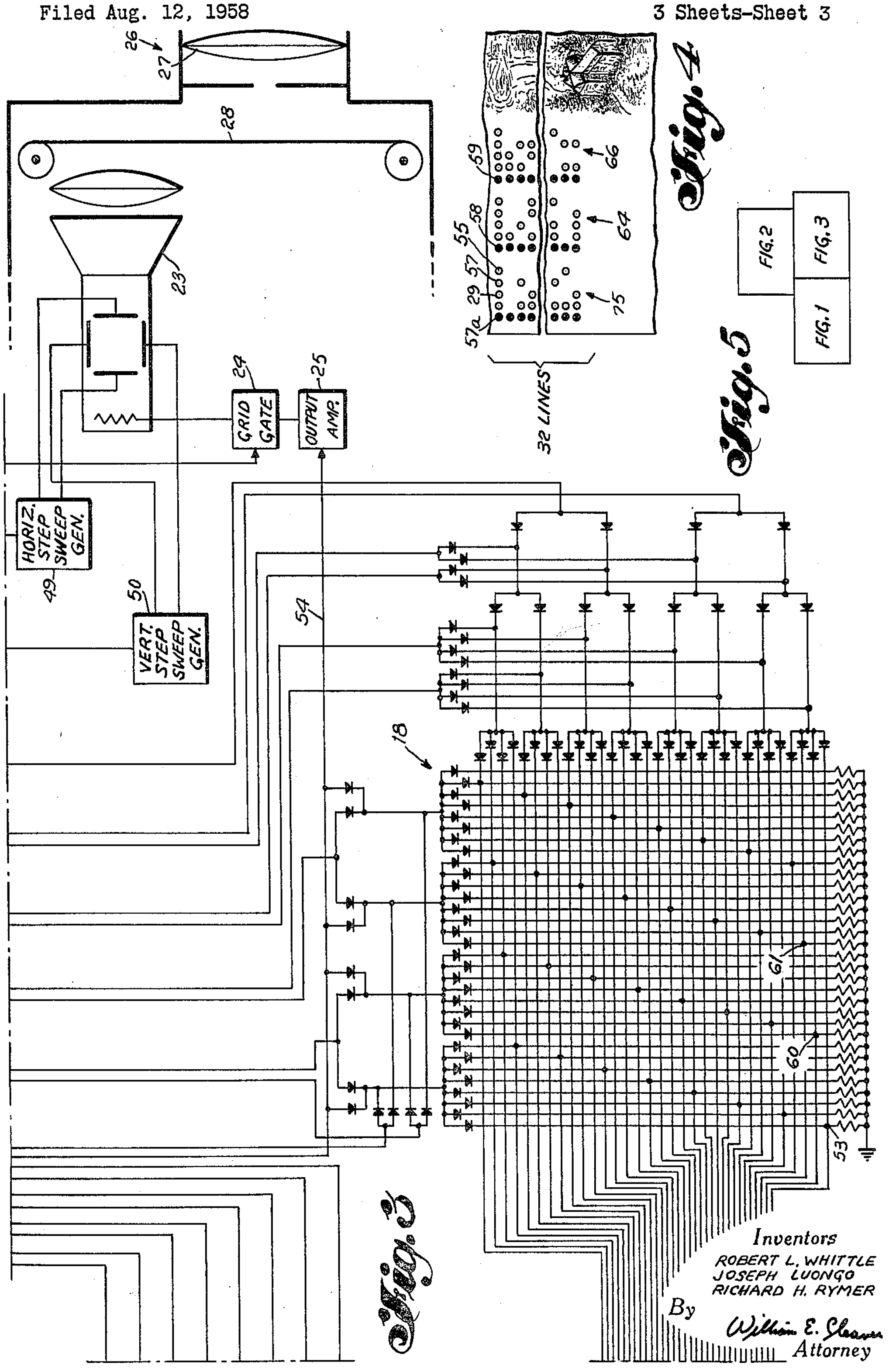
FIG. 3 is a schematic and block diagram showing the arrangement of the camera, the film, the cathode ray tube and the main switching matrix.
FIG. 4 shows a frame of film with the dotted raster thereon.
FIG. 5 is the layout for FIGS. 1, 2 and 3.

In FIG. 2, a counter chain 19 is sub-divided into a divide-by-five counter 20, a divide-by-thirty-two counter *20b*, and a pair of divide-by-three counters *20a*, *20c*. The counter chain 19 is tied to the input generator 21. A resistor diode network 22 to provide voltage levels at the horizontal and vertical controls of the cathode ray tube 23 of FIG. 3 is tied to the counter chain 19 of FIG. 2. Coupled to the divide-by-thirty-two counter *20b* is the diode matrix 18 of FIG. 3. Coupled to the divide-by-three counter *20a* is the second divided-by-three counter *20c* which in turn is coupled to the cathode ray tube grid gate in FIGURE 3. In FIG. 3, the output of the diode matrix 18 is coupled to an output amplifier 25 which in turn is coupled to the cathode ray tube grid gate 24. In FIG. 3, a camera 26 is shown disposed to photograph on one portion of the film 28 the picture appearing on the cathode ray tube 23 from the rear side of the film and on another portion a picture, probably of terrain over which the aircraft is flying, appearing in front of the lens 27. FIG. 4 shows a portion of a frame of film with a scene *66a* depicted as the subject matter. A more complete presentation of a frame of film with a dotted raster thereon is found in FIG. 2 of U.S. Patent 2,916,727, granted December 8, 1959 to C. E. Jones, Jr.

Referring in particular to FIG. 1 for a better understanding it is to be assumed that the eighteen Andicons represented by the banks 11, 12 and 13 are present in an aircraft and each is representing some portion of statistical information related to the flight of the aircraft. The aircraft in flight will be taking pictures of the terrain. The terrain will be viewed through the lens 27, FIG. 3, and photographed on the film 28. The operative end result of this invention is to also place on the frame of film 28 a dotted raster which is depicted by the dotted raster 29 of FIG. 4. The dotted raster represents coded information, as detected by the Andicons of FIG. 1. It is to be noted in FIG. 1 that the output lines, such as the output lines 30 of Andicon 31, can vary for each of the Andicons. The number of output lines for any individual Andicon depends on the particular quantity being measured by the Andicon. For instance, the quantity of latitude may require 7 output lines in order to measure 3 digits for degrees, 2 digits for minutes and 2 digits for seconds, whereas temperature may only need 4 output lines to represent 3 numbers for degrees and 1 number for tenths of degrees. In our illustration it is to be assumed that the Andicon 31 is recording temperature in degrees and tenths of degrees and the Andicon 32 is recording pressure in millibars and tenths of millibars. While the aircraft is in flight, the analog portions of the respective Andicons 31 and 32 are respectively and continually recording temperature and pressure.

Simultaneously with the recording, the Andicons of the three banks 11, 12 and 13 are continually scanned and the information is read out to the extent of passing significant voltage output signals to the cathode ray tube grid gate 24, FIG. 2. The continual scanning operation and readout operation is as follows. The input generator 21 is continually passing pulse signals to be counted. The pulses cause the divide-by-five counter 20 to count to five. The first pulse causes the three flip flops 33, 34 and 35 to go to zero as will be hereinafter described. The second pulse causes the divide-by-five counter to read 1—0—0, the third pulse transfers the counter to 0—1—0 and following a straight forward flip-flop chain arrangement at the fourth pulse, the flip flops 33 through 35 will be reading 1—1—0. The fifth pulse will transfer the flip-flops to read 0—0—1. The flip flops being in the last-mentioned condition will cause "and" gate 36 to be conditioned to conduct which will in turn block the inhibitor gate 37 and open the "and" gate 38. The sixth pulse which is really the first pulse of the second counting of five is unable to pass through the inhibitor gate 37 but does pass through the "and" gate 38 to reset the flip-flop 35 back to zero. Thus the first pulse drives the divide-by-five counter to 0—0—0. The fifth pulse in addition to blocking the inhibitor gate 37 and opening the "and" gate 38, sends a first pulse to the divide-by-thirty-two counter *20b*. Therefore at the fifth pulse the counter *20b* is conditioned to read 1—0—0—0—0. This operation continues and at the end of 32 pulses being sent to the counter *20b* the flip flops 40, 41, 42, 43 and 44 are returned to zero. Simultaneously, with the driving of the flip flops 40 through 44 to zero there is an output pulse passed to the divide-by-three counter *20a* which causes the counter *20a* to read 1—0. This operation continues until 2 pulses have been sent to the counter *20a* at which time the counter *20a* reads 0—1. The 0—1 condition of the counter *20a* opens the "and" gate 45 which in turn closes the inhibitor 46 and opens the "and" gate 47. With the inhibitor 46 closed and the "and" gate 47 open the third pulse from the divide-by-thirty-two counter *20b* passes through the "and" gate 47 to reset the flip-flop 48 to the zero side. Thus the third output pulse from counter *20b* causes the counter *20a* to read 0—0.

Depending on the condition of the counter chain the horizontal step sweep generator 49 and the vertical step sweep generator 50 of FIG. 3 are conditioned to place the beam of the cathode ray tube 23 in one of the 480 dot positions of the raster 29 as depicted in FIG. 4. The transistor amplifiers 51 and 52 of FIG. 2 merely serve to amplify the signal being passed to the horizontal and vertical step sweep generators.

The states of conduction of the flip flops of the divide-by-thirty-two counter *20b* condition the lines of the diode matrix 18 of FIG. 3 so that the proper Andicon output is read. Assuming in the illustration that the temperature information of the Andicon 31 is going to be read, let it be further assumed that all the flip flops of the entire counter chain are all sitting at zero. With all the flip flops sitting at zero a tracing of the lines of the matrix 18 from ground, through the respective resistances, through the diodes to the matrix 18 will reveal that the intersection point 53 of the matrix lines is the only point which is held negative. Since the output line 54 of the diode matrix 18 is tied to an "or" gate, the negative voltage level of the intersection point 53 effectively appears at the output line 54. With the divide-by-five counter 20 sitting at 0—0—0, the matrix 17 is conditioned such that the line *56a* is conducting to scan or test the first code bit of the Andicon 31. If at this time, as in the illustration, the circuit within the Andicon is able to conduct, indicating the presence of a code bit, then the output line 54 will recognize a positive potential. The positive potential on the output will render the grid of the cathode ray tube positive which will turn the beam on in the first raster position 55 as depicted in FIG. 4. The next pulse from the input generator 21 will cause the flip-flop 33 to transfer to the "one" side. With the divide-by-five counter 20 sitting at 1—0—0 the diode matrix 17 will only have line 56 conditioned to produce a readout from the Andicon 31. An examination of diode matrix 17 will reveal that with the counter 20 having its first two stages at 1—0, representing the second pulse, the only line which will be capable of testing or scanning the Andicon 31 will be the line *56b*. Line *56b* is tied through the cable 16 to the second bit position in the Andicons. In addition to being tied to the second bit position of the Andicon 31, line *56b* is tied to the second bit position of each of the Andicons in the bank 13. Each Andicon is simultaneously scanned with every other Andicon of the same bank. If there is a conductive circuit in the Andicon 31, and the line *56b* is conducting, the output line 54 of FIG.

3 will again recognize a positive voltage potential applied to the intersection point 53 of the matrix 18, and there will result a turning on of the beam to effect the dot at position 57 of the dotted raster shown in FIG. 4. This operation continues to test the four bits representing the first number for the temperature as detected by Andicon 31. Each of the Andicon's output lines represents a means to supply a row of dots. Andicon 31 having four output lines will provide pulses for four successive rows, in column 75, for example, and since each row has four bits, the Andicon 31 is capable of supplying 16 bit pulses. The four possible pulses as passed by the Andicon will appear at the intersection point 53 and will cause the output line 54 to either recognize a positive potential or remain negative depending on whether or not there is a coded bit present within the Andicon to provide a conductive path for the pulse. When the counter 20 gets to the fifth pulse and conditions the "and" gate 36, there is an output pulse tied therefrom to the output amplifier to automatically turn on the beam at a dotted position 57*a* of the dotted raster of FIG. 4 to insure that the index row will have dots present thereat. The index rows are represented by all the dots directly under the dot 57*a*, those under dot 58, and those under dot 59. Such vertical index rows are necessary for use in the ground equipment.

Each of the matrix line intersections 53, 60 and 61, etc. represents a horizontal line of dots on the dotted raster as described above. The intersection points 53, 60, 61, etc. are held in such condition as to be sensitive to four pulses representing the four information dots of each line of the dotted raster of FIG. 4. The fifth dot or index dot is added by the direct output from the gate 36 of FIG. 2, as described above. It can be seen from an examination of the matrix 18 that there are 32 points of intersection (53, 60, 61, etc.) represented by 32 horizontal lines of the dotted raster. The matrix 18 is used successively with each bank of Andicons to accomplish the representation of the three columns.

When the divide-by-thirty-two counter 20*b* has advanced to a count of 32 thereby enabling the equipment to scan and produce coded information dots for the Andicon bank 13, there will be a pulse from the counter 20*b* passed to the counter 20*a*. This pulse will render the counter 20*a* to read 1—0. With the counter 20*a* reading 1—0, the matrix 17, FIG. 1, will be conditioned to permit line 62 to be operative and therefore when the counter 20 commences to count, the lines 63 will be scanning each of the Andicons in bank 12. The counter chain operates as described above in connection with the Andicon bank 13 to scan and provide coded dot information for the second column of dots 64, FIG. 4. When the counter 20*b* has counted to 32 for the second time, another pulse is passed from counter 20*b* through the inhibitor gate 46 to counter 20*a* to cause this counter to read 0—1. With counter 20*a* reading 0—1 the matrix 17 of FIG. 1 renders the scanning lines 65 operative to scan the Andicon bank 11. The scanning of the Andicon bank 11 is identical with the operation described above in connection with the Andicon banks 12 and 13 and provides the information dots for the third column 66 on the dotted raster of FIG. 4.

When counter 20*a* was advanced to read 0—1, the "and" gate 45 is conditioned to conduct. The conducting condition of 45 in turn conditions the inhibitor gate 46 to block a subsequent pulse attempting to pass therethrough and opens the "and" gate 47 to permit the subsequent pulse to pass therethrough. Hence when counter 20*b* counts to 32 for the third time, the pulse output therefrom passes through the "and" gate 47 to reset the flip-flop 48 to zero rendering counter 20*a* to read 0—0. With counter 20*a* reading 0—0, matrix 17 is again conditioned to permit the scanning lines 67 to be operative and the entire operation of scanning the Andicon bank 13 starts over.

The scanning of the Andicon banks 11, 12 and 13, as described above, is a continuous operation and the coded information emanating therefrom is at all times available to be used for placement on the film. However, it is obvious that the cathode ray tube facing the back of the film and not having its light blocked by a shutter cannot be continuously turned on, for instance, when the film frame is being advanced lest there would be improper dots or lines photographed on the film. In view of this the dotted raster is only on the cathode ray tube at such time as there is received a demand signal from the camera equipment indicating that a new film frame has been advanced into the camera and it is ready to receive the dotted raster information to accompany the picture which it is taking. In FIG. 2 there is shown a cam operated contact 68 which is operated in conjunction with the shutter operation of the camera. For illustrative purposes let us assume that the cam contact 68 is closed when the camera shutter is opened.

With the closing of the cam contact 68, there is a ground level potential appearing at the input to the differentiating circuit 69 which in turn passes a pulse to the phantastron 70. The phantastron produces a pulse whose gate width is at least equal to the time for the counter 20*b* to count through a thirty-two cycle. This gate pulse from the phantastron 70 passes through the "or" gate 71 and conditions one leg of the demand gate 72. When counter 20*b* produces an output from its last stage this output pulse conditions the other leg of the demand gate 72 and produces an output from this demand gate. The output from the demand gate 72 transfers the flip-flop 73 to the "one" side and simultaneously renders counter 20*c* to read 1—0. With the flip-flop 73 conducting on the "one" side, a positive potential is passed through the "or" gate to hold the demand gate 72 open and simultaneously a positive potential is passed to the cathode ray tube grid gate 24 to hold this gate open. It follows then that after a demand signal has been received from the camera equipment, the cathode ray tube grid gate is open and therefore the output signals which appear on line 54 of FIG. 3 will pass through this cathode ray tube grid gate 24 to turn the beam of the cathode ray tube on or off to provide the dots on the raster. If the counter chain subsequently counts to 32, the output signals will be passed through the demand gate 72 to cause counter 20*a* to advance its count. Since the initial output from counter 20*a* received after the demand signal rendered counter 20*c* to read 1—0 it will take three output pulses from the counter 20*a* to return counter 20*c* to 0—0. This will enable the counting chain operation to count through the number thirty-two three times which will provide information for the three columns of the dotted raster, as shown in FIG. 4. At such time as counter 20*c* is returned to 0—0, an output pulse therefrom along line 74 will reset the flip-flop 73 to the zero side, thus closing the demand gate 72 and closing the cathode ray tube grid gate 24 to prevent any more pulses passing through either of these gates. It is apparent from this last-described operation that the demand signal may be received by the equipment at any time and the first bit of information put on the dotted raster may be any one of the columns 66, 64 or 75. Since the extracting of the information from the Andicon is cyclical all of the information will be put on the dotted raster within the counting of the three, as experienced by counter 20*c*. With the demand gate 72 closed and the cathode ray tube grid gate 24 closed, no more information will be passed to the film until a new film frame is advanced in the camera and there is a new demand pulse for information.

The dotted raster is photographed on the film 28 from the rear side of the film rather than from the front side of the film through the lens 27. This was done to overcome problems of effective aperture as related to objects which are off center from a lens. This inventive idea is more completely described in a copending application by R. L. Whittle et al., case 9–3, entitled "Camera," Serial No. 756,322, filed August 21, 1958, and now abandoned.

The coded information which now appears on the film accompanying the picture is in such binary form as to permit this information to be used in computer or data processing operations. This gives a greater advantage to this overall data processing in that, as described above, if the raw information must be corrected in order to obtain such information as the axis of the airplane from the ground track information and the drift information this axis determination can be automatically determined in any one of many well-known computers. This invention is described in an embodiment for use with an aerial reconnaissance operation. However, the recording of a dotted raster on a film to be used in conjunction with the subject matter on said film is not necessarily limited to taking pictures of terrain or to simply taking pictures. It is obvious that some operations, wherein the subject matter on the film might be a graph or an abstract display, would also require the accompaniment of a dotted raster to be used in interpreting the display.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for recording on a frame of a photographic film, symbols representing data from a plurality of sources of analog information comprising a plurality of analog-to-digital converters each adapted to have its input coupled to a different source of analog signals, a counting chain having a plurality of stages, a cathode ray tube having an electron beam and a fluorescent screen, the light from said fluorescent screen falling in a given area, means coupled to different individual stages of said counting chain and to said tube for directing said beam to cyclically scan said screen in a raster pattern, means including a first diode matrix coupled to said converters and to different individual stages of said counting chain to scan all of said converters in synchronism with the scanning of said screen to produce output signals therefrom, means including a second diode matrix coupled to different individual stages of said counting chain and to said converters for cyclically scanning the outputs of said converters so as to select each of the outputs of said converters produced by said first matrix in synchronism with a different one of the positions of the beam on the screen, means, normally blocked, for coupling the outputs from said second matrix to said cathode ray tube to control the turning on of the beam, a camera including means for moving said frame into the area in which the light from said fluorescent screen falls, means coupled to said camera and responsive to operation of the camera shutter producing a start signal, means responsive to a start signal for introducing an unblocking signal, counting means coupled to said counting chain for counting a period at least equal to the time required for one cycle of scanning of said cathode ray tube screen and terminating said unblocking signal at the end of said period, and means for applying said unblocking signal to said normally blocked means to cause the outputs from said second matrix to control the turning on of the beam.

2. A system for recording on a frame of a photographic film, symbols representing data from a plurality of sources of analog information comprising a plurality of analog-to-digital converters each adapted to have its input coupled to a different source of analog signals, a counting chain having a plurality of stages, a cathode ray tube having an electron beam and a fluorescent screen, the light from said fluorescent screen falling in a given area, means coupled to different individual stages of said counting chain and to said tube for directing said beam to cyclically scan said screen in a raster pattern, means including a first diode matrix coupled to said converters and to different individual stages of said counting chain to scan all of said converters in synchronism with the scanning of said screen and produce output signals therefrom, means including a second diode matrix coupled to different individual stages of said counting chain and to said converters for cyclically scanning the outputs of said converters so as to select each of the outputs of said converters produced by said first matrix in synchronism with a different one of the positions of the beam on the screen, means, normally blocked, for coupling the outputs from said second matrix to said cathode ray tube to control the turning on of the beam, a camera including means for moving said frame into the area in which the light from said fluorescent screen falls, means coupled to said camera and operative after a frame has been moved into position in said area for producing a start signal, and means responsive to said start signal, coupled to and controlled by said counting chain, for unblocking said normally blocked means for a period of time substantially equal to the time required for the beam to complete a full scanning cycle of said screen.

3. A system for recording on a frame of a photographic film, symbols representing data from a plurality of sources of information comprising a plurality of sources of variable information, a source of periodic oscillations, a digital counter coupled to said source of oscillations providing periodic overflow pulses, a cathode ray tube having a beam and a fluorescent screen, the light from said fluorescent screen falling in a given area, means coupled to combinations of stages of said counter for cyclically directing said beam towards different positions on said screen in a raster pattern determined by the digital states of said counter, means coupled to said counter for cyclically scanning said sources in accordance with the states of said counter so as to select each of the outputs of said sources in synchronism with a different line position of the beam on the fluorescent screen, means normally inoperative and coupled to said source-scanning means for sequentially applying the scanned outputs of said sources to said cathode ray tube to control the turning on of the beam, a camera including means for moving said frame into said given area in which the light from said fluorescent screen falls, means coupled to said camera and operative after said frame has been moved into position in said area for producing a start signal, and means responsive to said start signal in combination with the next overflow pulse out of said counter for rendering said normally inoperative means operative for a period of time substantially equal to the time required for the beam scanning directing means to cause the beam to cover a full cycle of positions on said screen.

4. A system for displaying in digital form on a cathode ray tube screen, information from a plurality of sources of analog information comprising a plurality of analog-to-digital converters, each adapted to have its input coupled to a different source of analog signals, a counting chain having a plurality of stages, a cathode ray tube having an electron beam and a fluorescent screen, means coupled to different individual stages of said counting chain and to said tube for directing said beam to cyclically scan said screen in a raster pattern, means including a first diode matrix coupled to said converters and to different individual stage of said counting chain to scan all of said converters and produce output signals therefrom, in synchronism with the scanning of said screen, means including a second diode matrix coupled to different individual stages of said counting chain for cyclically scanning the ouptuts of said converters so as to select each of the outputs of said converters in synchronism with a different one of the display surface positions of said beam, and means coupling the outputs selected by said second matrix to said tube to provide a composite indication of all of said converter outputs on said screen corresponding at each position to a different one of said selected outputs.

5. A system for displaying in digital form information from a plurality of sources of analog information comprising a plurality of analog-to-digital converters, each adapted to have its input coupled to a different source of analog signals, a source of clock pulses, a display device having a display surface, means for controlling the particular position on said surface at which an indication will appear, means responsive to said clock pulses and coupled to said controlling means for cyclically varying said position, means including a first diode matrix coupled between said converters and said source of clock pulses to scan all of said converters and produce output signals therefrom, during each said cyclic variation of said indication position, means including a second diode matrix responsive to said clock pulses for cyclically scanning the outputs of said converters so as to select each of the outputs of said converters in synchronism with a different one of the display surface positions, and means coupling the outputs selected by said second matrix to said display device to provide indications thereon corresponding at each position to a different one of said selected outputs.

6. A system for displaying in digital form information from a plurality of sources of analog information comprising a plurality of analog-to-digital converters, each adapted to have its input coupled to a different source of analog signals, a counting chain having a plurality of stages, means coupled to said counting chain for cyclically varying the count condition thereof, a display device having a display surface, means for controlling the particular position on said surface at which an indication will appear, means coupled to combinations of stages of said counting chain and to said controlling means for cyclically varying said indication position in accordance with the count condition in said chain, switching matrix means coupled to different individual stages of said counting chain for scanning all of said converters during each of said cyclic variations of said position so as to select each of the outputs of said converters in synchronism with a different one of the said indication positions, and means selectively operable during a single cycle of said position variations for coupling the output of said last-mentioned means to said display device during the selected cycle to provide controllably timed indications thereon, the indication at each position corresponding to a different one of the selected outputs of said converters.

7. A system for displaying in digital form information from a plurality of sources of analog information comprising a plurality of analog-to-digital converters, each adapted to have its input coupled to a different source of analog signals, a counter providing timing pulses, means for cyclically stepping said counter, a cathode ray tube having an electron beam and a fluorescent screen, a first means coupled to combinations of stages of said counter for directing said beam to cyclically scan said screen in a raster pattern in accordance with the states of said counter, a second means coupled to said counter for cyclically scanning said converters in accordance with the states of said counter so as to select each of the outputs of said sources in synchronism with a different line position of the beam on the fluorescent screen, and means selectively operable for a single one of said scanning cycles coupled to said second means for applying the successive outputs to said cathode ray tube during said single cycle to control the turning on of the beam and thereby to provide a controllably timed display indication.

References Cited in the file of this patent

UNITED STATES PATENTS

| | | |
|---|---|---|
| 1,722,935 | Messter | July 30, 1929 |
| 2,211,847 | Bryce | Aug. 20, 1940 |
| 2,594,731 | Connolly | Apr. 29, 1952 |
| 2,620,394 | Valensi | Dec. 2, 1952 |
| 2,807,005 | Weidenhammer | Sept. 17, 1957 |
| 2,839,974 | Reiner | June 24, 1958 |
| 2,850,723 | McNaney | Sept. 2, 1958 |
| 2,907,985 | Doersam | Oct. 6, 1959 |
| 2,916,727 | Jones | Dec. 8, 1959 |
| 2,937,914 | Blake | May 24, 1960 |
| 2,953,777 | Gridley | Sept. 20, 1960 |
| 2,987,715 | Jones et al. | June 6, 1961 |

OTHER REFERENCES

Electronics, October 1950, pages 90–95.